(12) United States Patent
Suzuki et al.

(10) Patent No.: US 11,597,283 B2
(45) Date of Patent: Mar. 7, 2023

(54) CONTROL APPARATUS FOR ELECTRIC VEHICLE, CONTROL SYSTEM FOR ELECTRIC VEHICLE, AND CONTROL METHOD FOR ELECTRIC VEHICLE

(71) Applicant: Hitachi Automotive Systems, Ltd., Hitachinaka (JP)

(72) Inventors: Keisuke Suzuki, Hitachinaka (JP); Satoshi Kaneko, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 12 days.

(21) Appl. No.: 16/617,870

(22) PCT Filed: May 18, 2018

(86) PCT No.: PCT/JP2018/019276
§ 371 (c)(1),
(2) Date: Nov. 27, 2019

(87) PCT Pub. No.: WO2018/221269
PCT Pub. Date: Dec. 6, 2018

(65) Prior Publication Data
US 2020/0189398 A1 Jun. 18, 2020

(30) Foreign Application Priority Data
Jun. 2, 2017 (JP) .............................. JP2017-109897

(51) Int. Cl.
*B60L 15/20* (2006.01)
*B60W 30/18* (2012.01)
(Continued)

(52) U.S. Cl.
CPC ........ *B60L 15/2009* (2013.01); *B60K 17/356* (2013.01); *B60L 7/18* (2013.01);
(Continued)

(58) Field of Classification Search
CPC . B60T 1/10; B60T 8/26; B60T 13/586; B60T 2270/604; B60T 2270/608;
(Continued)

(56) References Cited

U.S. PATENT DOCUMENTS 5,148,883 A * 9/1992 Tanaka ................... B60L 50/60
180/165
5,378,053 A * 1/1995 Patient ..................... B60L 7/12
303/3

(Continued)

FOREIGN PATENT DOCUMENTS

JP 2002-345105 A 11/2002
JP 2002345105 A * 11/2002
(Continued)

OTHER PUBLICATIONS

EPO machine translation of JP 2016-111891 (original JP document published Jun. 20, 2016) (Year: 2016).*
(Continued)

*Primary Examiner* — David A Testardi
(74) *Attorney, Agent, or Firm* — Crowell & Moring LLP

(57) ABSTRACT

An object of the present invention is to provide a control apparatus for an electric vehicle capable of preventing the vehicle from being destabilized because a rear wheel is locked first or drivability from reducing because a front wheel is locked early. A control apparatus includes a regenerative braking force calculation portion configured to calculate a regenerative braking force to be generated on each of a front motor and a rear motor based on a request braking force requested to an electric vehicle, a power limit portion configured to reduce the regenerative braking force based on a power limit on a power source, and a frictional braking force output portion configured to output an instruction for generating a frictional braking force according to a regenerative braking force reduction amount, which is an amount (Continued)

of a reduction in the regenerative braking force by the power limit portion, to a brake apparatus.

4 Claims, 8 Drawing Sheets

(51) Int. Cl.
| | | |
|---|---|---|
| *B60K 17/356* | (2006.01) | |
| *B60L 7/18* | (2006.01) | |
| *B60L 7/24* | (2006.01) | |
| *B60T 8/17* | (2006.01) | |
| *B60T 8/26* | (2006.01) | |
| *B60L 7/26* | (2006.01) | |

(52) U.S. Cl.
CPC ........ *B60L 7/24* (2013.01); *B60L 7/26* (2013.01); *B60T 8/17* (2013.01); *B60T 8/26* (2013.01); *B60W 30/18127* (2013.01); *B60T 2270/604* (2013.01); *B60T 2270/608* (2013.01)

(58) Field of Classification Search
CPC .......... B60L 7/24; B60L 7/26; B60L 15/2009; B60W 30/18127; B60W 2720/403; B60W 2720/406
See application file for complete search history.

(56) References Cited

U.S. PATENT DOCUMENTS

| | | | | |
|---|---|---|---|---|
| 6,484,833 | B1 * | 11/2002 | Chhaya | B60W 20/00 180/65.225 |
| 2002/0030408 | A1 * | 3/2002 | Niwa | B60T 8/267 903/918 |
| 2002/0180266 | A1 * | 12/2002 | Hara | B60K 6/543 903/918 |
| 2003/0080614 | A1 * | 5/2003 | Soga | B60W 10/08 903/918 |
| 2004/0070270 | A1 | 4/2004 | Gunji | |
| 2004/0238244 | A1 * | 12/2004 | Amanuma | B60W 10/08 180/65.225 |
| 2005/0099146 | A1 * | 5/2005 | Nishikawa | B60K 6/52 318/63 |
| 2005/0104445 | A1 * | 5/2005 | Choi | B60K 6/52 303/152 |
| 2005/0159871 | A1 * | 7/2005 | Nakamura | B60T 8/1755 701/70 |
| 2006/0015236 | A1 * | 1/2006 | Yamaguchi | B60T 8/1769 701/69 |
| 2008/0100129 | A1 * | 5/2008 | Lubbers | B60L 7/18 303/113.1 |
| 2009/0051304 | A1 * | 2/2009 | Muta | B60L 15/2009 318/376 |
| 2009/0302673 | A1 * | 12/2009 | Linhoff | B60T 8/1766 303/3 |
| 2012/0055744 | A1 * | 3/2012 | Chen | B60W 30/02 188/106 P |
| 2012/0152633 | A1 * | 6/2012 | Tamura | B60T 8/267 180/89.13 |
| 2016/0264111 | A1 * | 9/2016 | Doi | B60T 8/267 |
| 2016/0280191 | A1 * | 9/2016 | Okano | B60T 8/17552 |
| 2017/0113555 | A1 * | 4/2017 | Park | B60L 15/2009 |
| 2018/0257656 | A1 * | 9/2018 | Zhao | B60L 50/61 |

FOREIGN PATENT DOCUMENTS

| | | | | |
|---|---|---|---|---|
| JP | 2004-135471 A | | 4/2004 | |
| JP | 2004242460 A | * | 8/2004 | ......... B60L 15/2036 |
| JP | 2007196924 A | * | 8/2007 | ............... B60L 7/26 |
| JP | 2007-296933 A | | 11/2007 | |
| JP | 2007296933 A | * | 11/2007 | |
| JP | 2008301564 A | * | 12/2008 | ............... B60L 7/26 |
| JP | 2016111891 A | * | 6/2016 | |
| WO | WO-2005110827 A1 | * | 11/2005 | ............... B60T 8/00 |
| WO | WO-2012023162 A1 | * | 2/2012 | ......... B60L 15/2036 |

OTHER PUBLICATIONS

Extended European Search Report issued in European Application No. 18809208.4 dated Apr. 14, 2020 (10 pages).
International Search Report (PCT/ISA/210) issued in PCT Application No. PCT/JP2018/019276 dated Aug. 14, 2018 with English translation (three (3) pages).
Japanese-language Written Opinion (PCT/ISA/237) issued in PCT Application No. PCT/JP2018/019276 dated Aug. 14, 2018 with English Translation (nine (9) pages).

* cited by examiner

CONTROL APPARATUS FOR ELECTRIC VEHICLE, CONTROL SYSTEM FOR ELECTRIC VEHICLE, AND CONTROL METHOD FOR ELECTRIC VEHICLE

TECHNICAL FIELD

The present invention relates to a control apparatus, a control system, and a control method for an electric vehicle.

BACKGROUND ART

As a conventional technique, there is a control apparatus for an electric vehicle discussed in PTL 1. This control apparatus includes a front motor capable of controlling and driving a front wheel and a rear motor capable of controlling and driving a rear wheel. Then, PTL 1 discloses a technique that calculates an ideal braking force distribution ratio between a braking torque on the front wheel and a braking torque on the rear wheel and a tolerance for the ideal braking force distribution ratio, corrects the ideal braking force distribution ratio so as to increase power generation efficiency within a range of this tolerance, and outputs a torque instruction to each of the motors based on the acquired distribution ratio.

CITATION LIST

Patent Literature

[PTL 1] Japanese Patent Application Public Disclosure No. 2004-135471

SUMMARY OF INVENTION

Technical Problem

However, PTL 1 fails to take into consideration a control method regarding a front-rear torque distribution when a regenerative torque is limited due to a power limitation on a battery, thereby involving a possibility that a combined braking force of a frictional braking force and a regenerative braking force may deviate from the ideal braking force distribution ratio, causing the rear wheel to be locked first to destabilize the vehicle or the front wheel to be locked early to reduce drivability.

An object of the present invention is to provide a control apparatus for an electric vehicle capable of preventing the vehicle from being destabilized because the rear wheel is locked first or the drivability from reducing because the front wheel is locked early.

Solution to Problem

According to one aspect of the present invention, a control apparatus includes a regenerative braking force calculation portion configured to calculate a regenerative braking force to be generated on each of a front motor and a rear motor based on a request braking force requested to an electric vehicle, a power limit portion configured to reduce the regenerative braking force based on a power limit on a power source, and a frictional braking force output portion configured to output an instruction for generating a frictional braking force according to a regenerative braking force reduction amount, which is an amount of a reduction in the regenerative braking force by the power limit portion, to a brake apparatus.

Therefore, the control apparatus can prevent the braking force generated on the vehicle from deviating the request braking force, thereby preventing the vehicle behavior from being destabilized. Further, the control apparatus can prevent the vehicle from being destabilized because the rear wheel is locked first and the drivability from reducing because the front wheel is locked early.

DESCRIPTION OF EMBODIMENTS

First Embodiment

Figure 1:
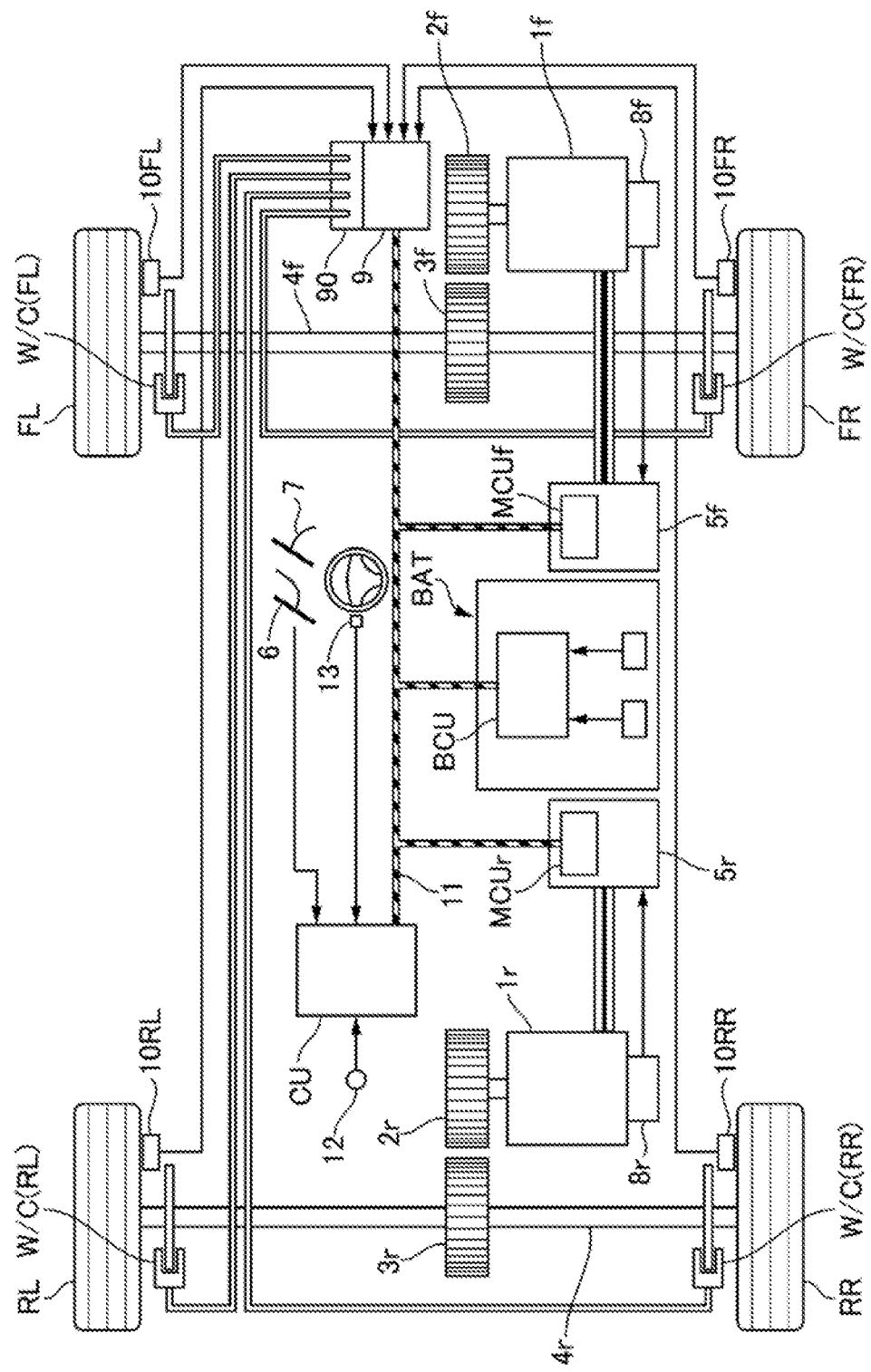
FIG. 1 is a system diagram of an electric vehicle according to a first embodiment.

FIG. 1 is a system diagram of an electric vehicle according to a first embodiment. The electric vehicle according to the first embodiment is a four-wheel drive vehicle, in which front wheels FL and FR are driven by a front motor 1*f* and rear wheels RL and RR are driven by a rear motor 1*r*. A differential gear 3*f* is connected to the front motor 1*f* via a speed reduction mechanism 2*f*. A drive shaft 4*f* is connected to the differential gear 3*f*. The front wheels FL and FR are connected to the drive shaft 4*f*. An inverter 5*f* includes a motor control unit MCUf, which controls the front motor 1*f*. Similarly, a differential gear 3*r* is connected to the rear motor 1*r* via a speed reduction mechanism 2*r*. A drive shaft 4*r* is connected to the differential gear 3*r*. The rear wheels RL and RR are connected to the drive shaft 4*r*. An inverter 5*r* includes a motor control unit MCUr, which controls the rear motor 1*r*.

A high-voltage battery BAT includes a battery control unit BCU, which controls supply power. The high-voltage battery BAT is a battery module formed by connecting a plurality of batteries, and the battery control unit BCU controls power to be supplied from one battery module to a plurality of motors (the front motor $1f$ and the rear motor $1r$).

The electric vehicle includes a stroke sensor 6, an accelerator position sensor 7, resolvers $8f$ and $8r$, an acceleration sensor 12, and a steering angle sensor 13. The stroke sensor 6 outputs a brake pedal stroke signal. The accelerator position sensor 7 outputs an accelerator position signal. The resolvers $8f$ and $8r$ each output a motor rotational speed signal including a rotational direction of the electric motor 1. The acceleration sensor 12 detects a longitudinal acceleration Xg and a lateral acceleration Yg of the vehicle. The steering angle sensor 13 detects a steering angle θ of a steering wheel. A vehicle control unit CU receives a range position signal from a shift lever, the brake pedal stroke signal from the stroke sensor 6, the accelerator position signal from the accelerator position sensor 7, and a steering angle signal from the steering angle sensor 13. Further, the vehicle control unit CU receives the motor rotational speed signals from the resolvers $8f$ and $8r$ via the motor control units MCUf and MCUr, respectively. The vehicle control unit CU calculates a driving torque instruction value directed to the electric motors 1 based on the accelerator position and the like, and drives the front motor $1f$ and the rear motor $1r$ according to the drive torque instruction value.

A brake hydraulic unit 90 is a unit that supplies a brake hydraulic pressure to each of wheel cylinders W/C(FL), W/C(FR), W/C(RL), and W/C(RR), which press brake pads against calipers mounted on the respective wheels. The brake hydraulic unit 90 is connected to a not-illustrated master cylinder, and also includes a pump and a plurality of electromagnetic valves. Then, the brake hydraulic unit 90 can supply a desired brake hydraulic pressure to each of the wheels independently of a master cylinder pressure by driving the pump and also activating the electromagnetic valves based on an instruction signal from a brake controller 9, which will be described below. By this operation, the brake hydraulic unit 90 generates a desired frictional braking force on each of the wheels. The brake controller 9 is connected to wheel speed sensors 10FL, 10FR, 10RL, and 10RR (hereinafter also referred to as simply 10) mounted on the respective wheels, and receives rotational speed signals of the respective wheels. The wheel speed sensors 10 each detect a wheel speed from a cycle of an electromagnetic pulse. The brake controller 9 adjusts brake fluid to be supplied to a brake unit using a hydraulic pressure at each of the wheels to control a braking torque on each of the wheels based on a driver's brake operation amount detected by the stroke sensor 6. Information communication among the motor control units MCUf and MCUr, the vehicle control unit CU, and the brake controller 9 is carried out via a CAN communication line 11.

Figure 2:
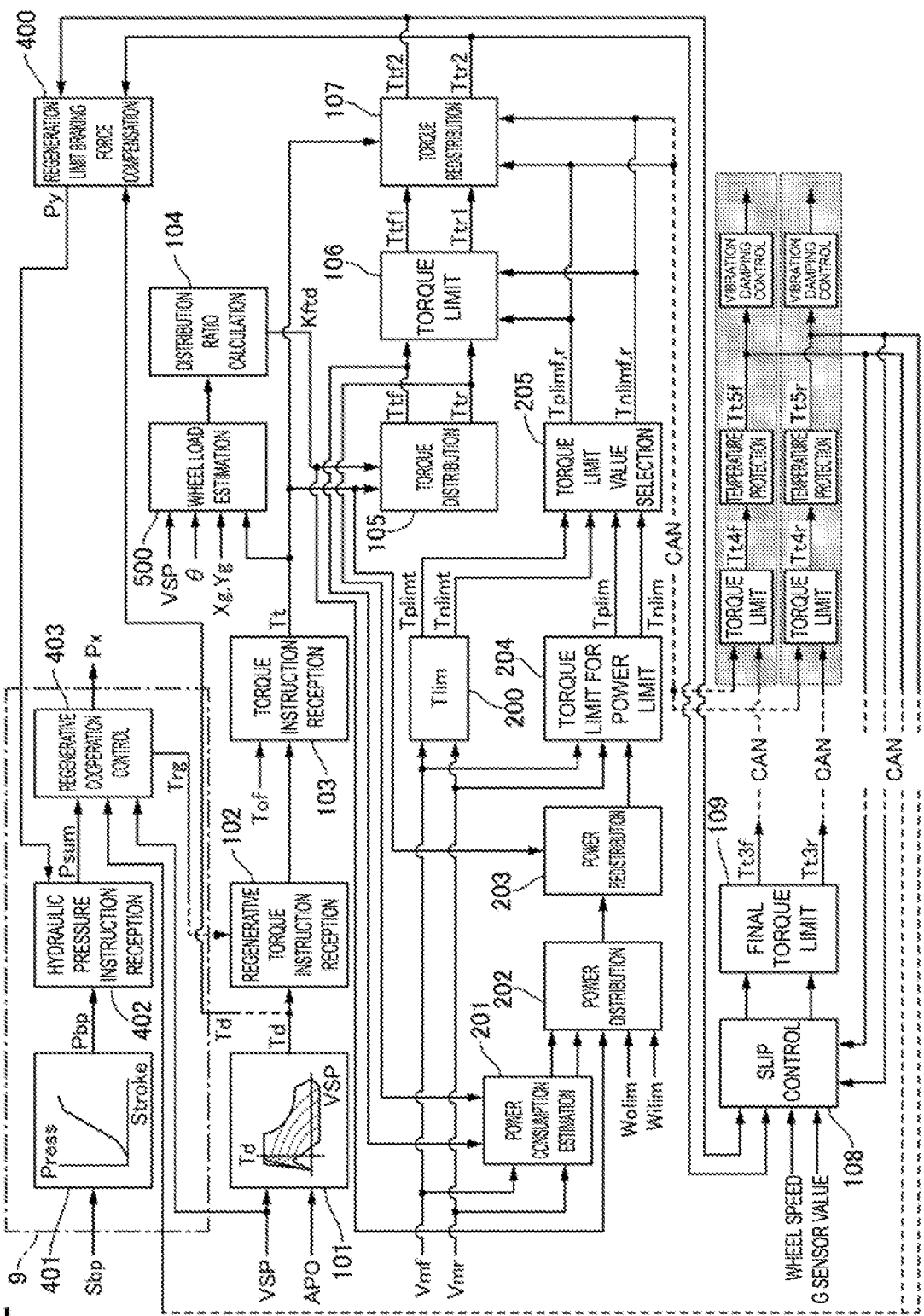
FIG. 2 is a control block diagram of the electric vehicle according to the first embodiment.

FIG. 2 is a control block diagram of the electric vehicle according to the first embodiment. The control block diagram illustrates a control block of the vehicle control unit CU and the brake controller 9.

(Details of Brake Controller)

Figure 9:
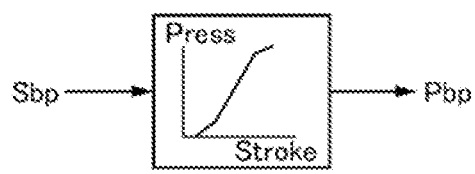
FIG. 9 illustrates a map set in a driver request brake hydraulic pressure calculation portion 401 according to the first embodiment.

A driver request brake hydraulic pressure calculation portion 401 inputs a driver's brake pedal stroke Stroke detected by the stroke sensor 6, and calculates a driver request brake hydraulic pressure Pbp based on a preset map. FIG. 9 illustrates the map set in the driver request brake hydraulic pressure calculation portion 401 according to the first embodiment. As illustrated in FIG. 9, the driver request brake hydraulic pressure calculation portion 401 includes the map adapted to the pedal stroke in advance. This map is a map set while a running feeling is checked from an experiment or the like.

Figure 10:
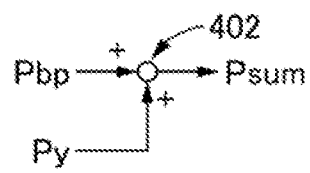
FIG. 10 is a control block diagram illustrating a hydraulic pressure instruction reception portion according to the first embodiment.

A hydraulic pressure instruction reception portion 402 outputs a total hydraulic pressure instruction Px based on a braking force compensation hydraulic pressure instruction value Py calculated by a regeneration limit braking force compensation portion 400 in the vehicle control unit CU, which will be described below, and the driver request brake hydraulic pressure Pbp. FIG. 10 is a control block diagram illustrating the hydraulic pressure instruction reception portion according to the first embodiment. The hydraulic pressure instruction reception portion 402 outputs a value acquired by adding the braking force compensation hydraulic pressure instruction value Py to the driver request brake hydraulic pressure Pbp, as the total hydraulic pressure instruction Psum. The braking force compensation hydraulic pressure instruction value Py will be described below.

Figure 11:
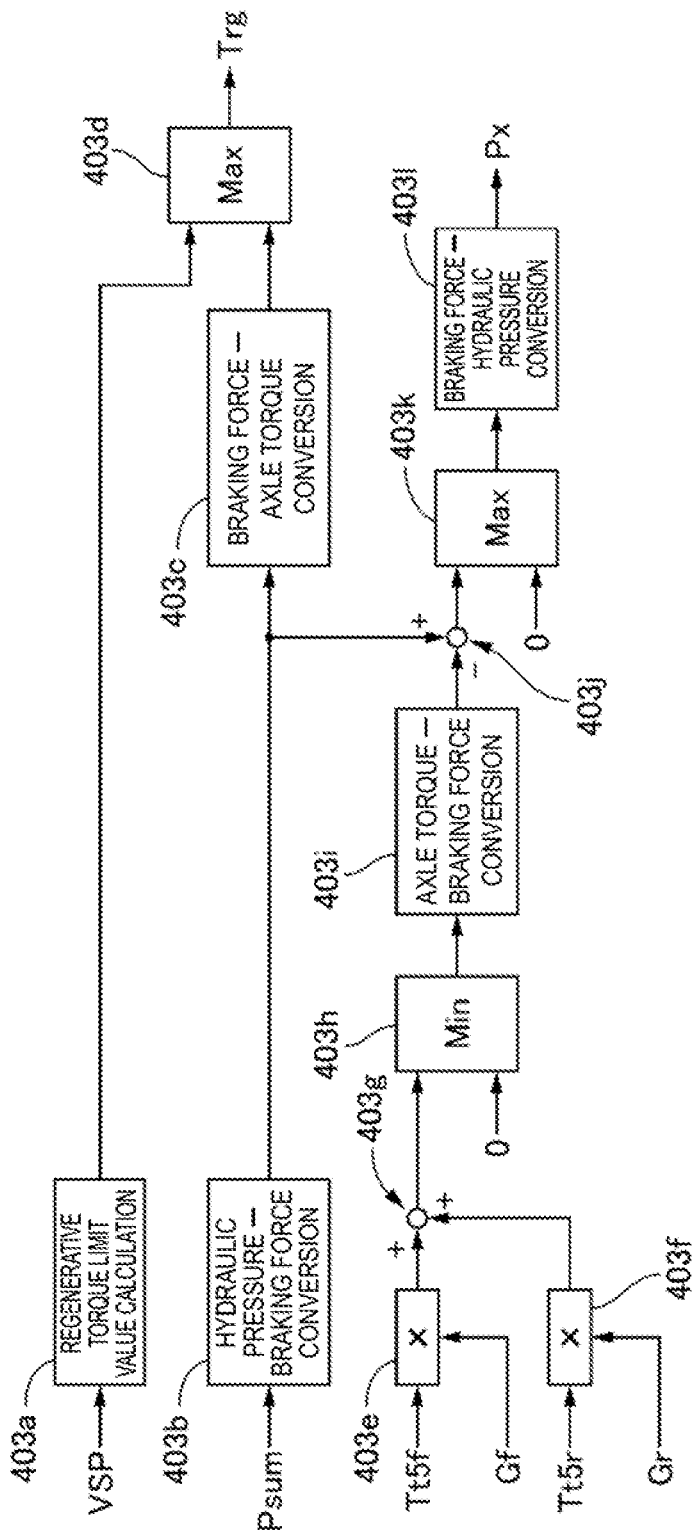
FIG. 11 is a control block diagram illustrating a regenerative cooperation control portion according to the first embodiment.

A regenerative cooperation control portion 403 outputs a request regenerative torque Trg and a brake hydraulic pressure instruction Px based on the vehicle speed VSP, the total hydraulic pressure instruction Psum, a front wheel torque instruction value Tt5$f$ and a rear wheel torque instruction value Tt5$r$ that are torque instructions before vibration damping control, which will be described below, a speed reduction ratio Gf of the speed reduction mechanism $2f$ on the front wheel side, and a speed reduction ratio Gr of the speed reduction mechanism $2r$ on the rear wheel side. FIG. 11 is a control block diagram illustrating the regenerative cooperation control portion according to the first embodiment. A regenerative torque limit value calculation portion 403a calculates a regenerative torque limit value based on the vehicle speed VSP. This limit value is a value prepared for setting an upper limit on a generatable regenerative torque according to the vehicle speed in advance, and is set in such a manner that the upper limit on the regenerative torque reduces as the vehicle speed increases. Further, at an extremely low vehicle speed, the upper limit on the regenerative torque is set to zero because it is difficult to control a rotational state of the motor. The regenerative torque limit value is a value leading to generation of the braking force when being a negative value.

A hydraulic braking force conversion portion 403b converts the total hydraulic pressure instruction Psum, which indicates the braking force requested to the vehicle, from the hydraulic pressure into the braking force. The hydraulic pressure instruction is a value leading to generation of the braking force when being a positive value. A braking force-axle torque conversion portion 403c converts the converted braking force into an axle torque. The axle torque is a value leading to generation of the braking force when being a negative value. A limit portion 403d outputs larger one of the regenerative torque limit value set to a negative value and the axle torque set to a negative value as the request regenerative torque Trg. Therefore, no request is issued for a braking force greater than a braking force generated according to the regenerative torque limit value.

A front wheel axle torque calculation portion 403e calculates a front wheel axle torque by multiplying the motor torque instruction value Tt5$f$ calculated in the motor control units MCUf and MCUr, which will be described below, by the gear ratio Gf of the speed reduction mechanism $2f$. The motor torque instruction value Tt5$f$ is a torque before a vibration damping torque is added by a vibration damping control portion 303$f$, and indicates an actual regenerative braking torque. Similarly, a rear axle torque calculation portion 403$f$ calculates a rear axle torque by multiplying the motor torque instruction value Tt5$r$ by the gear ratio Gr of the speed reduction mechanism $2r$. An addition portion 403g calculates an axle torque of the vehicle by adding the front wheel axle torque and the rear wheel axle torque. This axle toque has a positive value for a torque on an acceleration side, and has a negative value for a torque on a deceleration side (a regenerative side).

A torque extraction portion 403h selects and outputs smaller one of the calculated axle torque of the vehicle and zero. This selection is intended to extract only the axle torque calculated as a negative value and ignore the acceleration torque calculated as a positive value. An axle torque-braking force conversion portion 403i converts the extracted axle torque into the braking force. When the axle torque is a negative value, the braking force is converted as a positive value.

A difference calculation portion 403j calculates a hydraulic pressure difference, which is a braking force corresponding to insufficiency that would occur when the regenerative torque is used alone, by subtracting the value converted into the braking force from the motor torque instruction values Tt5f and Tt5r from the value converted into the braking force from the total hydraulic pressure instruction Psum. Now, when the hydraulic pressure difference is a positive value, this means a state in which the regenerative braking force falls short of the request braking force, and the braking force should be secured by supplying the brake hydraulic pressure. On the other hand, when the hydraulic pressure difference is a negative value, this means that the regenerative braking force is sufficiently secured for the request braking force, and the brake hydraulic pressure does not have to be supplied. Therefore, a braking force calculation portion 403k extracts larger one of zero and the hydraulic pressure difference as a braking force that should be secured by supplying the brake hydraulic pressure. A braking force-hydraulic pressure conversion portion 403l converts the braking force that should be secured by supplying the brake hydraulic pressure into the brake hydraulic pressure, and outputs it to the brake hydraulic unit 90 as the brake hydraulic pressure instruction Px. The brake hydraulic unit 90 generates a hydraulic pressure based on the brake hydraulic pressure instruction Px in each of the wheel cylinders. The braking forces generated on the front and rear wheels at this time satisfy a front braking force: a rear braking force=(1−Kbd):Kbd based on a rear reference distribution ratio Kbd, respectively.

(Details of Vehicle Control Unit)

A driver request torque calculation portion 101 calculates a driver's request torque Td based on the accelerator position APO and the vehicle speed VSP. The driver's request torque Td is set to a larger value as the accelerator position APO increases. Further, when the acceleration position APO is equal to or lower than a predetermined value indicating a release of a foot, a torque on the deceleration side (a negative value) imitating an engine brake is set.

A regenerative torque reception portion 102 receives the request regenerative torque Trg based on the request braking torque calculated by the regenerative cooperation control portion 403, and corrects the driver request torque Td.

A request torque reception portion 103 receives a request driving torque Tof calculated by another calculation portion, and corrects the driver request torque Td. A total axle torque instruction value of the front motor 1f and the rear motor 1r acquired from the respective instruction values of the driver request torque calculation portion 101, the regenerative torque reception portion 102, and the request torque reception portion 103 is output as the request torque Tt of the vehicle.

Figure 3:
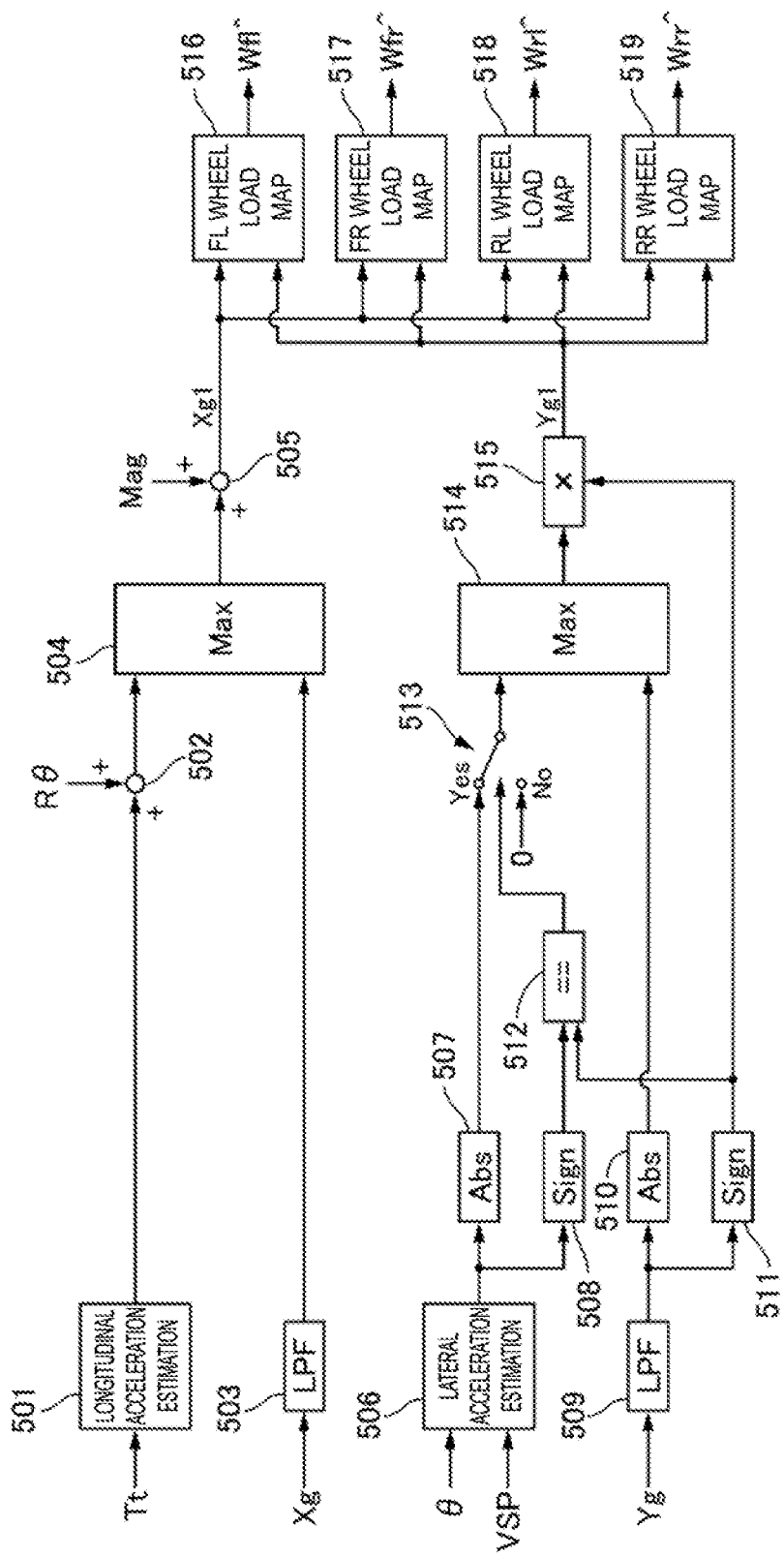
FIG. 3 is a control block diagram illustrating a wheel load estimation portion according to the first embodiment.

A wheel load estimation portion 500 calculates estimated wheel loads $Wfl\hat{\ }\hat{\ }$, $Wfr\hat{\ }$, $Wrl\hat{\ }$, and $Wrr\hat{\ }$ of the respective wheels based on the vehicle speed VSP, the steering angle θ, the longitudinal acceleration sensor value Xg, and the lateral acceleration sensor value Yg. FIG. 3 is a control block diagram illustrating the wheel load estimation portion according to the first embodiment.

(Regarding Longitudinal Acceleration)

A longitudinal acceleration estimation portion 501 calculates a longitudinal acceleration estimated value $Xg\hat{\ }$ based on the request torque Tt. At this time, a torque-acceleration conversion constant is determined based on a tire dynamic radius, an assumed vehicle weight, and speed reducer efficiency. A slope correction portion 502 adds a longitudinal acceleration Rθ generated due to an estimated slope to the longitudinal acceleration estimated value $Xg\hat{\ }$ calculated based on the request torque Tt. A longitudinal acceleration estimated value $Xg\hat{\ }\hat{\ }$ is acquired while being corrected in such a manner that the vehicle longitudinal acceleration reduces when the vehicle is running on an uphill road and increases when the vehicle is running on a downhill road. A low-pass filter 503 performs low-pass filter processing on the longitudinal acceleration sensor value Xg detected by the acceleration sensor 12, thereby removing noise.

A selection portion 504 selects and outputs smaller one of the longitudinal acceleration estimated value $Xg\hat{\ }\hat{\ }$ and the longitudinal acceleration sensor value Xg. A margin addition portion 505 adds such a margin amount Mag that a load movement to the front wheel side increases to prevent the rear wheel side from having a lock tendency first, and outputs a longitudinal acceleration Xg1 to be used to eventually calculate the wheel load. In this manner, the wheel load can be estimated before actual occurrence of the wheel load movement based on the longitudinal acceleration, by estimating the longitudinal acceleration based on the request torque Tt. However, the stability of the wheel load estimated value is secured by comparing the estimated value with the sensor value of the acceleration sensor 12 and selecting larger one to take an error in the estimated value into consideration.

(Lateral Acceleration)

A lateral acceleration estimation portion 506 calculates a lateral acceleration estimated value $Yg\hat{\ }$ based on the steering angle θ and the vehicle speed VSP. This lateral acceleration estimated value can be easily calculated from a generally known vehicle model, and details of the calculation will not be described herein. An absolute value calculation portion 507 calculates an absolute value of the lateral acceleration estimated value $Yg\hat{\ }$. A sign extraction portion 508 extracts a sign of the lateral acceleration estimated value $Yg\hat{\ }$. A low-pass filter 509 performs low-pass filter processing on the lateral acceleration sensor value Yg detected by the acceleration sensor 12, thereby removing noise. An absolute value calculation portion 510 calculates an absolute value of the lateral acceleration sensor value Yg. A sign extraction portion 511 extracts a sign of the lateral acceleration sensor value Yg. The sign is assumed to be positive when the vehicle is turning right, and negative when the vehicle is turning left. A sign check portion 512 determines whether the sign of the lateral acceleration estimated value $Yg\hat{\ }$ and the sign of the lateral acceleration sensor value Yg match each other, and outputs a Yes signal when they match each other and a No signal when they do not match each other. An estimated value verification portion 513 outputs the absolute value of the lateral acceleration estimated value $Yg\hat{\ }$ when the sign check portion 512 outputs the Yes signal and outputs zero when the sign check portion 512 outputs the No signal. In other words, the mismatch of the sign between the estimated value and the sensor value can be determined to be a countersteering state. In this case, the output of zero indicates discarding the lateral acceleration estimated value Yĝ. A selection portion 514 outputs larger one from the absolute value of the lateral acceleration estimated value Yĝ and the absolute value of the lateral acceleration sensor value Yg. A sign multiplication portion 523 multiplies the value selected by a selection portion 522 by the sign extracted from the sensor value, and outputs a lateral acceleration Yg1 to be used to eventually calculate the wheel load. In this manner, estimating the lateral acceleration based on the vehicle speed VSP and the steering angle θ allows the wheel load to be estimated before the actual occurrence of the wheel load movement based on the lateral acceleration, thereby contributing to realizing a torque distribution according to load balance. However, the stability of the wheel load estimated value is secured by comparing the estimated value with the sensor value of the acceleration sensor 12 and selecting larger one to take an error in the estimated value into consideration.

(Regarding Wheel Load Map)

An FL wheel load map 516, an FR wheel load map 517, an RL wheel load map 518, and an RR wheel load map 519 calculate estimated wheel loads Wfl̂, Wfr̂, Wrl̂, and Wrr̂ of the respective wheels based on the longitudinal acceleration Xg1 and the lateral acceleration Yg1. For example, the estimated wheel loads Wfl̂, Wfr̂, Wrl̂, and Wrr̂ are calculated in such a manner that the wheel load increases on the front right wheel and reduces on the rear left wheel when the longitudinal acceleration Xg1 is high on the deceleration side and the lateral acceleration Yg1 is a lateral acceleration generated when the vehicle is turning left. The estimated wheel loads Wfl̂, Wfr̂, Wrl̂, and Wrr̂ may be calculated from not only the maps but also from a vehicle model.

Figure 4:
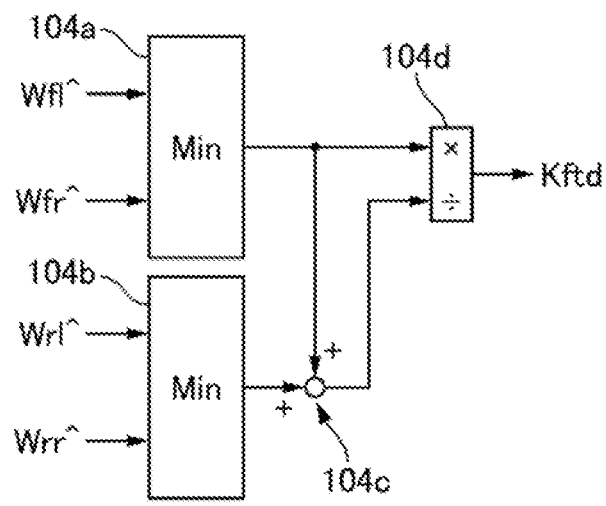
FIG. 4 is a control block diagram illustrating a distribution ratio calculation portion according to the first embodiment.

A distribution ratio calculation portion 104 determines a front wheel torque distribution ratio Kftd to be used when the request torque Tt is distributed to the front motor 1f and the rear motor 1r based on the estimated wheel loads Wfl̂, Wfr̂, Wrl̂, and Wrr̂ of the respective wheels. FIG. 4 is a control block diagram illustrating the distribution ratio calculation portion according to the first embodiment. A front wheel selection portion 104a selects and outputs smaller one of the estimated wheel load Wfl̂ of the front left wheel and the estimated wheel load Wfr̂ of the front right wheel. A rear wheel selection portion 104b selects and outputs smaller one of the estimated wheel load Wrl̂ of the rear left wheel and the estimated wheel load Wrr̂ of the rear right wheel. The vehicle according to the first embodiment includes the two motors, i.e., the front motor 1f and the rear motor 1r but includes no motor on each of the wheels, and therefore selects smaller one of the estimated wheel loads on each of the front wheel side and the rear wheel side. Smaller one of the estimated wheel loads is selected because this allows the electric vehicle to deal with a wheel load on a wheel that more likely slip. This is because a frictional force between the vehicle wheel and the road surface is proportional to the wheel load (a normal force), considering them based on the same frictional coefficient.

An addition portion 104c adds the front wheel-side estimated wheel load and the rear wheel-side estimated wheel load. A front wheel torque distribution ratio calculation portion 104d calculates the front wheel torque distribution ratio Kftd by dividing the front wheel-side estimated wheel load by a value acquired by adding the front wheel-side estimated wheel load and the rear wheel-side estimated wheel load. A rear wheel torque distribution ratio is (1−Kftd).

A torque distribution portion 105 calculates a reference front motor torque instruction value Ttf and a reference rear motor torque instruction value Ttr based on the request torque Tt and the front wheel torque distribution ratio Kftd. Hereinafter, the front motor 1f and the rear motor 1r will be collectively referred to as reference motor torque instruction values Ttfr. These reference motor torque instruction values Ttfr correspond to a target torque when the front motor 1f and the rear motor 1r are controlled.

A torque limit portion 106 calculates a first front motor torque instruction value Ttf1 and a first rear motor torque instruction value Ttr1 (hereinafter, these instruction values will be referred to as first torque instruction values Tt1) limited based on positive torque limit values Tplimf and Tplimr and negative torque limit values Tnlimf and Tnlimr (hereinafter, these limit values will be referred to as torque limit values Tlim) selected by a torque limit value selection portion 205, which will be described below. In other words, acceleration reference motor toque instruction values Ttfry are corrected so as to fall within a range defined by the torque limit values Tlim.

A torque redistribution portion 107 calculates a second front motor torque instruction value Ttf2 and a second rear motor torque instruction value Ttr2 (hereinafter, these instruction values will be referred to as second torque instruction values Tt2) resulting from redistributing the torque to a motor corresponding to the first torque instruction value Tt1 smaller than the torque limit value Tlim within such a range that a sum of the first torque instruction values Tt1 of the respective motors does not exceed the request torque Tt, when the sum of the first torque instruction values Tt1 of the respective motors falls below the request torque Tt. At the time of the regeneration, the torque is not redistributed in light of prioritizing the vehicle stability.

A slip control portion 108 determines whether a slip has occurred on a wheel based on the wheel speed sv, the longitudinal acceleration Xg, and torque instruction values of temperature protection portions 302f and 302r, which will be described below, and calculates a torque limit amount directed to a motor torque connected to the wheel that has slipped when the slip has occurred (including both a driving slip and a braking slip).

A final torque limit portion 109 outputs, to each of the motors 1f and 1r, a final torque instruction value Tt3 determined based on the torque limit amount calculated by the slip control portion 108 for the second torque instruction value Tt2.

A maximum torque limit value calculation portion 200 calculates positive torque limit values Tplimtf and Tplimtr and negative torque limit values Tnlimtf and Tnlimtr (hereinafter, Tplimtf, Tplimtr, Tnlimtf, and Tnlimtr will also be referred to as maximum torque limit values Tlimax) of the respective motors based on a rotational speed Vmf of the front motor 1f and a rotational speed Vmr of the rear motor 1r. A torque characteristic with respect to the number of rotations of the motor is predetermined, and these limit values are determined by setting a maximum outputtable torque value with respect to some rotational speed based on a map or the like.

Figure 5:
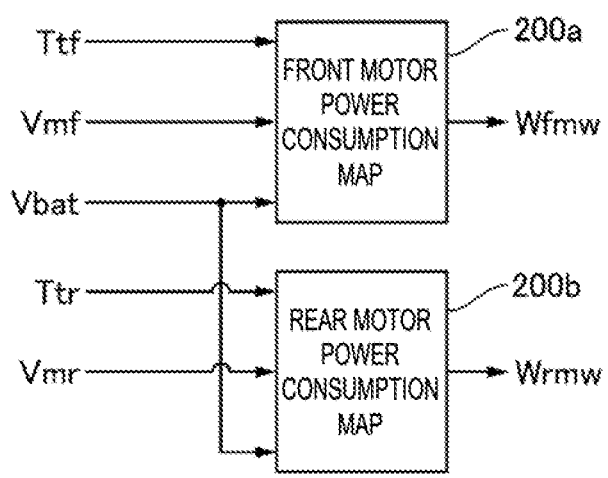
FIG. 5 is a control block diagram illustrating a power consumption estimation portion according to the first embodiment.

A power consumption estimation portion 201 calculates a front motor power consumption estimated value Wfmw and a rear motor power consumption estimated value Wrmw based on a battery voltage Vbat of the high-voltage battery BAT, the rotational speed Vmf of the front motor 1f, the rotational speed Vmr of the rear motor 1r, and the reference front motor torque instruction value Ttf and the reference rear motor torque instruction value Ttr calculated by the torque distribution portion 105. FIG. 5 is a control block diagram illustrating the power consumption estimation portion according to the first embodiment. A front motor power consumption estimation portion 200a calculates the front motor power consumption estimated value Wfmw consumed by the inverter 5f and a motor 8f based on a preset map, based on the front motor torque instruction value Ttf, the rotational speed Vmf, and the battery voltage Vbat. A rear motor power consumption estimation portion 200b calculates the rear motor power consumption estimated value Wrmw consumed by the inverter 5r and a motor 8r based on a preset map, based on the rear motor torque instruction value Ttr, the rotational speed Vmr, and the battery voltage Vbat. Each of the power consumption values is calculated as a negative value when the front motor 1f and the rear motor 1f generate the regenerative torque. This means a calculation of charging power for charging the high-voltage battery BAT.

A power distribution portion 202 calculates a first power limit value Wlimf1 of the front motor 1f and a first power limit value Wlimr1 of the rear motor 1r (hereinafter, Wlimf1 and Wlimr1 will also be referred to as first power limit values Wlim1) based on a battery power limit value Wlim, which is an upper limit value on power supplied from the high-voltage battery BAT, and the front wheel torque distribution ratio Kftd. Similarly, the power distribution portion 202 calculates a charging power limit value Wilimf of the front motor 1f and a charging power limit value Wilimr of the rear motor 1r (hereinafter, Wilimf and Wilimr will also be referred to as charging power limit values Wilim) based on the front motor power consumption estimated value Wfmw, the rear motor power consumption estimated value Wrmw, and a battery charging power limit value Wilim, which is an upper limit value on power for charging the high-voltage battery BAT. The battery power limit value Wlim and the battery charging power limit value Wilim are values set in light of reducing heat generation and preventing overcharging.

Figure 6:
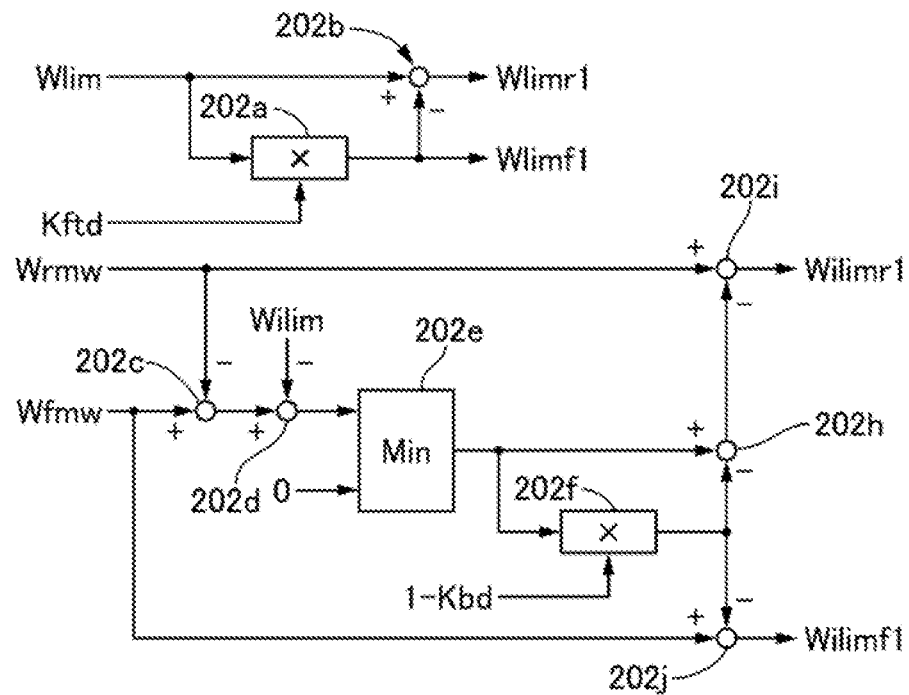
FIG. 6 is a control block diagram illustrating a power distribution portion according to the first embodiment.

FIG. 6 is a control block diagram illustrating the power distribution portion according to the first embodiment. An upper side in FIG. 6 illustrates a flow for calculating the first power limit values Wlim1. A front power limit value calculation portion 202a calculates the first power limit value Wlimf1 of the front motor 1f by multiplying the battery power limit value Wlim by the front wheel torque distribution ratio Kftd. A rear power limit value calculation portion 202b calculates the first power limit value Wlimr1 of the rear motor 1r by subtracting the first power limit value Wlimf1 from the battery power limit value Wlim. More specifically, when power is supplied from the single high-voltage battery BAT to the plurality of motors, determining the power consumption of each of the motors individually may cause total power consumption to exceed a battery discharge power limit value Wolim. Further, it is also conceivable to correct the torque of each of the motors so as to prevent the power consumption from exceeding the battery power limit value Wolim after determining the power consumption of each of the motors individually, but this method necessitates a repetition of the calculation. On the other hand, in the first embodiment, each of the motor torques can be effectively controlled without exceeding the battery discharge power limit value Wolim, by distributing the power in advance and setting the first power limit value Wolim1 of each of the motors based on this power distribution. Motor efficiency is approximately the same between the front motor 1f and the rear motor 1r, which allows the power to be distributed according to the torque distribution ratio.

On the other hand, a lower side in FIG. 6 illustrates a flow for calculating the charging power limit values Wilim. A power consumption addition portion 202c calculates a total power consumption estimated value Wmw by adding the rear motor power consumption estimated value Wrmw and the front motor power consumption estimated value Wfmw. A difference calculation portion 202d calculates a difference between the total power consumption estimated value and the battery charging power limit value Wilim. A charging request determination portion 202e compares the difference and zero, and outputs smaller one of them. In other words, when the difference between the power with which the motor charges the high-voltage battery BAT by generating the regenerative torque, and the battery charging power limit value Wilim is a negative value, this means that the charging power is generated by an amount unacceptable by the high-voltage battery BAT side (hereinafter referred to as excessive charging power). The braking force corresponding to this excessive charging power Wover should be supplemented by generating the frictional braking force by the brake hydraulic unit 90. When the difference is a positive value, this means that the charging power can be entirely accepted by the high-voltage battery BAT side, and therefore zero is output.

A frictional braking force corresponding distribution portion 202f calculates a front-side excessive charging power Wfover by multiplying the excessive charging power Wover by (1−Kbd) with use of the rear reference distribution ratio Kbd, which is the braking force ratio between the front and rear individual brakes when the same brake hydraulic pressure is applied to the four wheels by the brake hydraulic unit 90. A rear-side excessive charging power calculation portion 202h calculates a rear-side excessive charging power Wrover by subtracting the front-side excessive charging power Wfover from the excessive charging power Wover. A rear-side charging power limit value calculation portion 202i outputs a rear-side charging power limit value Wilimr1 by subtracting the rear-side excessive charging power Wrover from the rear motor power consumption estimated value Wrmw. A front-side charging power limit value calculation portion 202j outputs a front-side charging power limit value Wilimf1 by subtracting the front-side excessive charging power Wfover from the front motor power consumption estimated value Wfmw. As a result, a ratio when the excessive charging power Wover is subtracted from the front motor power consumption estimated value Wfmw and the rear motor power consumption estimated value Wrmw can be subtracted according to the ratio at which the frictional braking force is distributed to the front wheel side and the rear wheel side.

Figure 7:
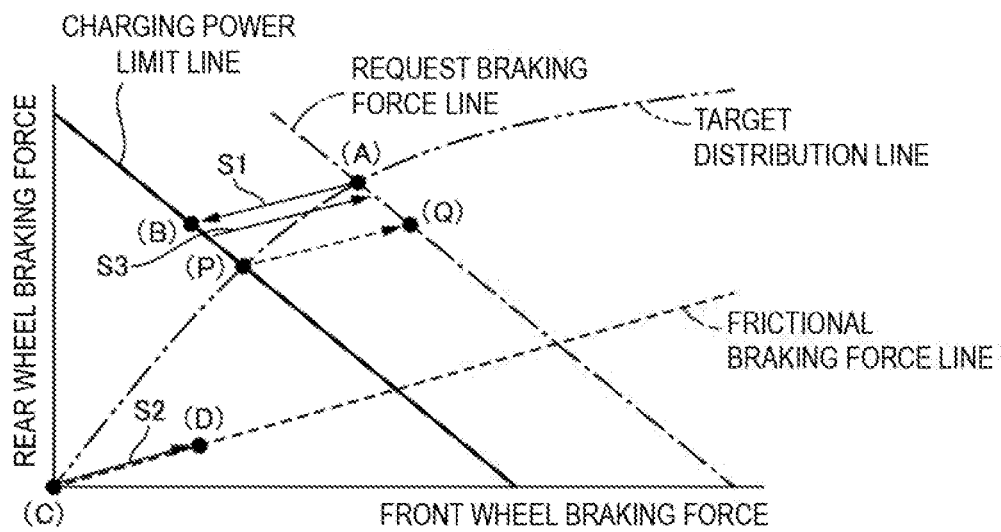
FIG. 7 illustrates a characteristic of a braking force for facilitating better understanding of a function at a frictional braking force distribution portion according to the first embodiment.

FIG. 7 illustrates a characteristic of the braking force for facilitating better understanding of a function at the frictional braking force distribution portion according to the first embodiment. A horizontal axis represents the front wheel braking force, and a vertical axis represents the rear wheel braking force. Some point illustrated in FIG. 7 will be referred to as a braking point. A request braking force line in FIG. 7 indicates a relative relationship between the front wheel braking force and the rear wheel braking force that realizes the request torque Tt. A charging power limit line in FIG. 7 indicates a relative relationship between the front wheel regenerative braking force and the rear wheel regenerative braking force that corresponds to the charging power limit value Wilim, and means that the regenerative braking force can be generated only in a region below the charging power limit value. A target distribution line in FIG. 7 indicates an ideal characteristic of the distribution of the braking force to the front wheel and the rear wheel. A frictional braking force line in FIG. 7 indicates a relative relationship between the front wheel-side frictional braking force and the rear wheel-side frictional braking force generated by the brake hydraulic unit 90. A safety prioritizing characteristic for securing the vehicle stability and other various characteristics can be set by establishing a lock tendency on the front wheel side preferentially as the target distribution line without being limited to the ideal distribution characteristic.

A braking point should be located at an intersection point (A) between the request braking force line and the target distribution line to satisfy the request braking force and realize the ideal distribution of the braking force to the front and rear wheels. However, even if an attempt is made to realize the braking point (A) only by means of the regenerative braking force for both the front wheel and the rear wheel, the braking point (A) would be unable to be realized because exceeding the charging power limit line. This leads to a necessity of adjusting the regenerative braking force onto some braking point on the charging power limit line and compensating for the insufficiency with the frictional braking force. One possible method therefor is to set the regenerative braking force at an intersection point (P) between the charging power limit line and the target distribution line and providing the frictional braking force, thereby achieving a braking point (Q) on the request braking force line. However, although satisfying the request braking force, the braking point (Q) results in excessive distribution of the braking force to the front wheel side compared to the braking point (A) corresponding to the ideal braking force distribution and thus fails to achieve the appropriate braking force distribution, thereby being unable to sufficiently stabilize the vehicle behavior.

Therefore, the first embodiment is configured to shift the braking point at the ratio that matches the rear reference distribution ratio Kbd indicated by the frictional braking force line when shifting the braking point from the braking point (A) onto the charging power limit line. In other words, the first embodiment is configured to match up a regenerative braking force reduction ratio, which is a ratio of the amount of the reduction in the regenerative braking force of the rear motor 1r to the amount of the reduction in the regenerative braking force of the front motor 1f, and a frictional braking force increase ratio, which is a ratio of the amount of the increase in the frictional braking force to be generated on the rear wheel to the amount of the increase in the frictional braking force to be generated on the front wheel. In this case, as indicated by an arrow S1, the regenerative braking force is set to a braking point (B), at which a line passing through the braking point (A) and extending in parallel with the frictional braking force line, and the charging power limit line intersect each other. Then, as indicated by an arrow S2, the frictional braking force is generated according to a vector connecting braking points (C) and (D). The braking point (A) can be acquired by combining the braking point (B) to this vector, as indicated by an arrow S3. Therefore, the present configuration can acquire the request braking force at the ideal braking force distribution on the target distribution line as the braking force resulting from combining the regenerative braking force and the frictional braking force, thereby stabilizing the vehicle behavior. In addition, the present configuration can prevent the drivability from reducing because the front wheel is locked early, and prevent the vehicle stability from reducing because the rear wheel is locked early.

A power redistribution portion 203 calculates a second power limit value Wlimf2 of the front motor 1f and a second power limit value Wlimr2 of the rear motor 1r (hereinafter, Wlimf2 and Wlimr2 will also be referred to as second power limit values Wlim2) resulting from distributing extra power after subtracting actual power consumption Wx (x=f or r) from the first power limit value Wlim1 of one of these motors to the power limit value Wlim1 of the other motor. At the time of the regeneration, the power is not redistributed in light of prioritizing the vehicle stability.

A first torque limit value calculation portion 204 calculates a positive torque limit value Tplimw and a negative torque limit value Tnlimw (hereinafter, Tplimw and Tnlimw will also be referred to as first torque limit values Tlimw) according to the battery potential Vbat of the high-voltage battery BAT, the rotational speeds Vmf and Vmr, and the second power limit values Wlim2.

A torque limit value selection portion 205 selects lower one of the maximum torque limit value Tlimmax and the first torque limit value Tlimw, and outputs it as the torque limit value Tlim.

The regeneration limit braking force compensation portion 400 calculates the braking force compensation hydraulic pressure Py based on the second front motor torque instruction value Ttf2, the second rear motor torque instruction value Ttr2, and the driver request torque Td. The regeneration limit braking force compensation portion 400 functions at the time of the regenerative braking without the torque instruction reception portion 103 receiving another request driving torque Tof.

Figure 8:
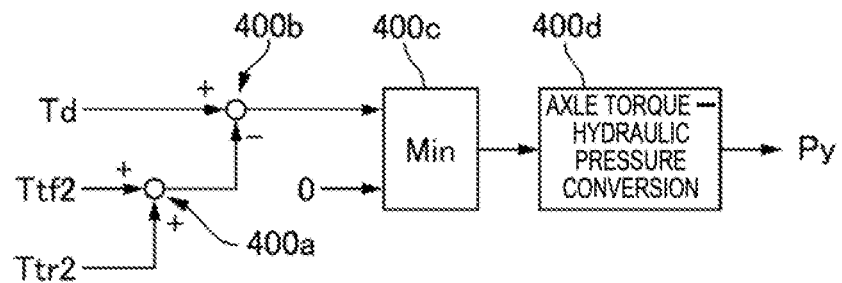
FIG. 8 is a control block diagram illustrating a regeneration limit braking force compensation portion according to the first embodiment.

FIG. 8 is a control block diagram illustrating the regeneration limit braking force compensation portion according to the first embodiment. A second motor torque instruction value calculation portion 400a calculates a torque after the torque redistribution by adding the second front motor torque instruction value Ttf2 and the second rear motor torque instruction value Ttr2. A difference calculation portion 400b subtracts the torque after the torque redistribution from the driver request torque Td, and outputs a difference after the redistribution. A braking force extraction portion 400c outputs smaller one of the difference after the redistribution and zero. An axle torque-hydraulic pressure conversion portion 400d converts an axial torque according to the difference after the redistribution into the brake hydraulic pressure, and outputs the braking force compensation hydraulic pressure instruction value Py.

In other words, the difference after the redistribution is output when the difference after the redistribution is a negative value, and zero is output when the difference after the redistribution is a positive value. When the difference after the redistribution is a negative value at the time of the regenerative braking, this indicates that, when the driver is detected to be in a state releasing his/her foot from the accelerator based on the accelerator position sensor 7 and an acceleration off regenerative torque request corresponding to the engine brake is output, the reference motor torque instruction value Ttfr is limited by the negative torque limit values Tnlimf and Tnlimr and the first torque instruction value Tt1 (<Ttfr) is output. At this time, the braking force corresponding to the difference after the redistribution can be compensated for by the brake hydraulic pressure.

The motor control units MCUf and MCUr include torque limit portions 301f and 301r, temperature protection portions 302f and 302r, and vibration damping control portions 303f and 303r, respectively. The torque limit portions 301f and 301r each calculate a motor torque instruction value Tt4 limited based on the final torque instruction value Tt3 output from the final torque limit portion 109 and the torque limit value Tlim output from the torque limit value selection portion 205. The temperature protection portions 302f and 302r each limit the motor to a motor torque instruction value Tt5f or Tt5r limited in such a manner that the motor has a predetermined or lower temperature, according to a heat generation amount calculated based on a value of a current supplied to the motor and a value measured by a temperature sensor mounted on the motor. The vibration damping control portions 303f and 303r each calculate a vibration damping torque for damping a vibration generated on the drive shaft 4f or 4r, add the vibration damping torque to the motor torque instruction value, and finally performs the motor torque control.

[Processing for Distributing Braking Force]

Figure 12A:
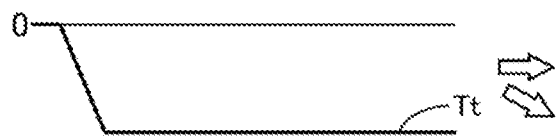
FIGS. 12A, 12B, 12C, 12D, 12E, 12F, 12G, and 12H are timing charts illustrating processing for distributing a braking force according to the first embodiment.
Figure 12B:
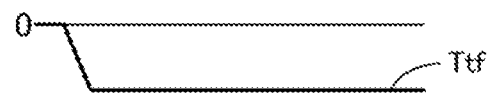

Next, processing for distributing the braking force will be described with reference to a timing chart. FIGS. 12A to 12G are timing charts illustrating the processing for distributing the braking force according to the first embodiment. FIG. 12A illustrates a state in which the driver presses the brake pedal and the request braking torque Tt is requested to the vehicle as the braking force. From this state, the reference front motor torque instruction value Ttf, which is the regenerative torque on the front wheel side, and the reference rear motor torque instruction value Ttr, which is the regenerative torque on the rear wheel side, are calculated with use of the estimated wheel loads Wfl^, Wfr^, Wrl^, and Wrr^ as illustrated in FIG. 12B.

Figure 12D:
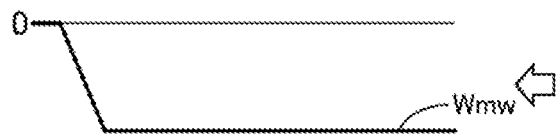
Figure 12C:
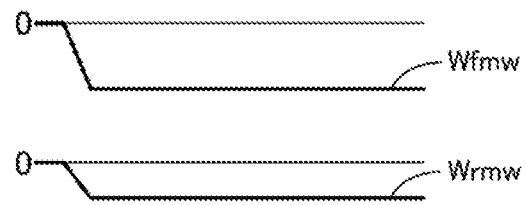

Next, the front motor power consumption estimated value Wfmw and the rear motor power consumption estimated value Wrmw consumed by the respective motors are calculated based on the reference front motor torque instruction value Ttf and the reference rear motor torque instruction value Ttr as illustrated in FIG. 12C. Then, the total power consumption estimated value Wmw is calculated as illustrated in FIG. 12D.

Figure 12E:
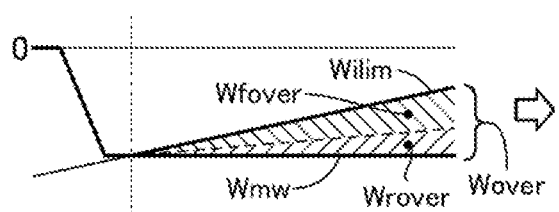
Figure 12F:
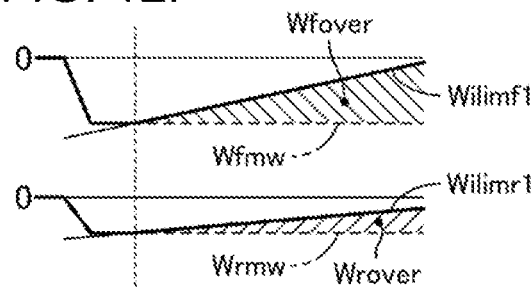
Figure 12H:
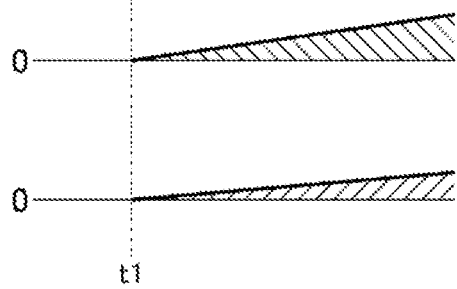
Figure 12G:
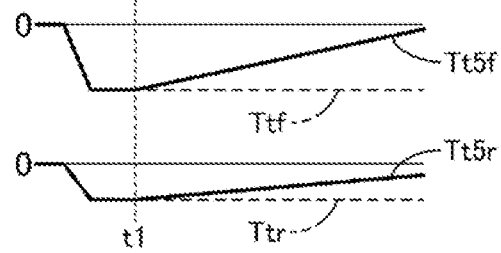

Next, the excessive charging power Wover in the total power consumption estimated value Wmw that cannot be used for the charging on the high-voltage battery BAT side is calculated based on the battery charging power limit values Wilim as illustrated in FIG. 12E. Then, this excessive charging power Wover is divided into Wfover and Wrover based on the rear reference distribution ratio Kbd indicating the front-rear distribution ratio of the friction braking force generated by the brake hydraulic unit 90. Then, the front-side charging power limit value Wilimfl and the rear-side charging power limit value Wilimrl are calculated as illustrated in FIG. 12F. Then, the motor torque instruction values Tt5f and Tt5r, which are the regenerative torques according to these limit values, are generated on the front motor 1f and the rear motor 1r. Further, when Px is supplied into the front wheel-side wheel cylinders W/C (FL and FR) and the rear wheel-side wheel cylinders W/C (RL and RR) as illustrated in FIG. 12H to secure the braking force corresponding to the excessive charging power Wover with the frictional braking force, the front and rear frictional braking force is distributed to the front side and the rear side according to the distribution ratio Kbd. An upper side and a lower side in FIG. 12H illustrate the frictional braking force on the front wheel side and the frictional braking force on the rear wheel side, respectively. As a result, the braking state corresponding to the target distribution as the braking point and satisfying the request braking force can be secured as described with reference to FIG. 7.

In the above-described manner, the first embodiment can bring about advantageous effects that will be listed now. (1) The first embodiment is the control apparatus for the electric vehicle. The electric vehicle includes the front motor 1f configured to output the torque to the front wheel of the vehicle by the supply and the reception of the power to and from the high-voltage battery BAT (a power source), the rear motor 1r configured to output the torque to the rear wheel of the vehicle by the supply and the reception of the power to and from the high-voltage battery BAT, and the brake hydraulic unit 90 (a brake apparatus) capable of providing the frictional braking force to each of the front wheel and the rear wheel. The control apparatus includes the torque distribution portion 105 (a regenerative braking force calculation portion) configured to calculate the regenerative braking force to be generated on the front motor 1f and the rear motor 1r based on the request torque Tt (a request braking force) requested to the vehicle, the power distribution portion 202 (a power limit portion) configured to reduce the regenerative braking force based on the power limit on the high-voltage battery BAT, and the regenerative cooperation control portion 403 (a frictional braking force output portion) configured to output the instruction for generating the frictional braking force according to the regenerative braking force reduction amount, which is the regenerative braking force by which the regenerative braking force is reduced by the power distribution portion 202, to the brake hydraulic unit 90.

Therefore, the control apparatus can prevent the braking force generated on the vehicle from deviating the request torque Tt, thereby preventing the vehicle behavior from being destabilized. Further, the control apparatus can prevent the vehicle from being destabilized because the rear wheel is locked first and the drivability from reducing because the front wheel is locked early.

(2) The power distribution portion 202 sets the regenerative braking force reduction ratio, which is the ratio of the regenerative braking force reduction amount of the rear motor 1r to the regenerative braking force reduction amount of the front motor 1f, according to the frictional braking force.

Therefore, due to the presence of the connection between the regenerative braking force reduction ratio and the frictional braking force, the control apparatus can prevent the braking force generated on the vehicle from deviating from the request torque Tt.

(3) The power distribution portion 202 reduces the regenerative braking force in such a manner that the regenerative braking force reduction ratio (for example, the gradient of the line connecting the braking points (A) and (B) in FIG. 7), which is the ratio of the regenerative braking force reduction amount of the rear motor 1r to the regenerative braking force reduction amount of the front motor 1f, matches or exceeds the frictional braking force front-rear ratio (for example, the gradient of the line connecting the braking points (D) and (C) in FIG. 7), which is the ratio of the frictional braking force of the rear wheel to the frictional braking force of the front wheel.

In this case, because the front wheel braking force is set to a relatively large value with respect to the target distribution line, the control apparatus can prevent the vehicle from being destabilized because the rear wheel is locked first.

(4) The power distribution portion 202 reduces the regenerative braking force in such a manner that the regenerative braking force reduction ratio matches or exceeds the frictional braking force front-rear ratio, and falls below the braking force request ratio (for example, the gradient of the line connecting the braking points (A) and (C) in FIG. 7), which is the ratio of the regenerative braking force of the rear motor to the regenerative braking force of the front motor that is calculated by the torque distribution portion 105.

In this case, because the front wheel braking force is set to a relatively large value with respect to the target distribution line, the control apparatus can prevent the vehicle from being destabilized because the rear wheel is locked first. Further, the control apparatus can avoid an excessive increase in the front wheel braking force, thereby preventing the drivability from reducing because the front wheel is locked early.

(5) The power distribution portion 202 reduces the regenerative braking force in such a manner that the regenerative braking force reduction ratio matches the frictional braking force front-rear ratio.

Therefore, the control apparatus can most effectively prevent the braking force generated on the vehicle from deviating the request torque Tt, thereby preventing the vehicle behavior from being destabilized. Further, the control apparatus can prevent the vehicle from being destabilized because the rear wheel is locked first and the drivability from reducing because the front wheel is locked early. (6) The torque distribution portion 105 calculates the regenerative braking force to be generated on each of the front motor 1$f$ and the rear motor 1$r$ with respect to the request torque Tt based on the front wheel load and the rear wheel load of the vehicle.

Therefore, the control apparatus can appropriately realize the torque distribution according to the running state of the vehicle.

(7) The control apparatus further includes the lateral acceleration estimation portion 514 (an estimated lateral acceleration calculation portion) configured to calculate the lateral acceleration estimated value Yĝ to be generated on the vehicle based on VSP (a speed of the vehicle) and θ (a steering angle), and the longitudinal acceleration estimation portion 501 (an estimated longitudinal acceleration calculation portion) configured to calculate the longitudinal acceleration estimated value Xĝ to be generated on the vehicle based on the request torque Tt (an instruction for a torque to be generated on an axle of the vehicle). The wheel load estimation portion 500 calculates the estimated wheel loads Wflˆ, Wfrˆ, Wrlˆ, and Wrrˆ (a front wheel load and a rear wheel load) based on the lateral acceleration estimated value Yĝ and the longitudinal acceleration estimated value Xĝ.

Therefore, the control apparatus can estimate the wheel load before the actual occurrence of the wheel load movement based on the acceleration, thereby realizing the torque distribution according to the load balance.

(8) The control apparatus further includes the lateral acceleration estimation portion 514 configured to calculate the lateral acceleration estimated value Yĝ to be generated on the vehicle based on VSP and θ, the wheel load estimation portion 500 (a detected lateral acceleration acquisition portion) configured to acquire the lateral acceleration sensor value Yg (a detected lateral acceleration) from the acceleration sensor 12 configured to detect the acceleration of the vehicle, the selection portion 522 (a lateral acceleration selection portion) configured to select the acceleration having a larger absolute value as the selected lateral acceleration from the lateral acceleration estimated value Yĝ and the lateral acceleration sensor value Yg, the longitudinal acceleration estimation portion 501 configured to calculate the longitudinal acceleration estimated value Xĝ to be generated on the vehicle based on the request torque Tt, the wheel load estimation portion 500 (a detected longitudinal acceleration acquisition portion) configured to acquire the longitudinal acceleration sensor value Xg (a detected longitudinal acceleration) from the acceleration sensor 12, and the selection portion 510 (a longitudinal acceleration selection portion) configured to select the acceleration having a larger absolute value as the selected longitudinal acceleration from the longitudinal acceleration estimated value Xĝ and the acquired longitudinal acceleration sensor value Xg. The wheel load estimation portion 500 calculates the estimated wheel loads Wflˆˆ, Wfrˆ, Wrlˆ, and Wrrˆ based on the selected lateral acceleration and the selected longitudinal acceleration.

Therefore, the control apparatus can estimate the wheel load before the actual occurrence of the wheel load movement based on the acceleration, thereby realizing the torque distribution according to the load balance. Further, the control apparatus can stably estimate the wheel load even when the estimated acceleration contains an error, such as when the vehicle is running on a sloping road or is sideslipping, by selecting the value having a larger absolute value from the estimated value and the sensor value.

(9) The estimated value verification portion 521 outputs zero as the lateral acceleration estimated value Yĝ when the sign is different between the lateral acceleration estimated value Yĝ and the lateral acceleration sensor value Yg.

Therefore, the control apparatus can detect the countersteering state, and stably estimate the wheel load by discarding the lateral acceleration estimated value Yĝ at the time of the countersteering state.

In the following description, other configurations recognizable from the above-described embodiment will be described.

According to one configuration, a control apparatus for an electric vehicle is provided. The electric vehicle includes a front motor configured to output a torque to a front wheel of the electric vehicle by supply and reception of power to and from a power source, a rear motor configured to output a torque to a rear wheel of the electric vehicle by supply and reception of power to and from the power source, and a brake apparatus capable of providing a frictional braking force to each of the front wheel and the rear wheel. The control apparatus includes a regenerative braking force calculation portion configured to calculate a regenerative braking force to be generated on the front motor and the rear motor based on a request braking force requested to the electric vehicle, a power limit portion configured to reduce the regenerative braking force based on a power limit on the power source, and a frictional braking force output portion configured to output an instruction for generating the frictional braking force according to a regenerative braking force reduction amount, which is an amount of a reduction in the regenerative braking force by the power limit portion, to the brake apparatus.

According to a further preferable configuration, in the above-described configuration, the power limit portion sets a regenerative braking force reduction ratio, which is a ratio of the regenerative braking force reduction amount of the rear motor to the regenerative braking force reduction amount of the front motor, according to the frictional braking force.

According to another preferable configuration, in any of the above-described configurations, the power limit portion reduces the regenerative braking force in such a manner that a regenerative braking force reduction ratio, which is a ratio of the regenerative braking force reduction amount of the rear motor to the regenerative braking force reduction amount of the front motor, matches or exceeds a frictional braking force front-rear ratio, which is a ratio of the frictional braking force of the rear wheel to the frictional braking force of the front wheel.

According to further another preferable configuration, in any of the above-described configurations, the power limit portion reduces the regenerative braking force in such a manner that the regenerative braking force reduction ratio matches or exceeds the frictional braking force front-rear ratio, and falls below a braking force request ratio, which is a ratio of the regenerative braking force of the rear motor to the regenerative braking force of the front motor that is calculated by the regenerative braking force calculation portion.

According to further another preferable configuration, in any of the above-described configurations, the power limit portion reduces the regenerative braking force in such a manner that the regenerative braking force reduction ratio matches the frictional braking force front-rear ratio.

According to further another preferable configuration, in any of the above-described configurations, the regenerative braking force calculation portion calculates the regenerative braking force to be generated on each of the front motor and the rear motor based on the request braking force and a front wheel load and a rear wheel load of the electric vehicle.

According to further another preferable configuration, in any of the above-described configurations, the control apparatus further includes an estimated lateral acceleration calculation portion configured to calculate an estimated lateral acceleration to be generated on the electric vehicle based on a speed of the electric vehicle and a steering angle, and an estimated longitudinal acceleration calculation portion configured to calculate an estimated longitudinal acceleration to be generated on the electric vehicle based on an instruction for a torque to be generated on an axle of the electric vehicle. The regenerative braking force calculation portion calculates the front wheel load and the rear wheel load based on the estimated lateral acceleration and the estimated longitudinal acceleration.

According to further another preferable configuration, in any of the above-described configurations further, the control apparatus further includes an estimated lateral acceleration calculation portion configured to calculate an estimated lateral acceleration to be generated on the electric vehicle based on a speed of the electric vehicle and a steering angle, a detected lateral acceleration acquisition portion configured to acquire a detected lateral acceleration from an acceleration sensor configured to detect an acceleration of the electric vehicle, a lateral acceleration selection portion configured to select an acceleration having a larger absolute value as a selected lateral acceleration from the estimated lateral acceleration and the detected lateral acceleration, an estimated longitudinal acceleration calculation portion configured to calculate an estimated longitudinal acceleration to be generated on the electric vehicle based on an instruction for a torque to be generated on an axle of the electric vehicle, a detected longitudinal acceleration acquisition portion configured to acquire a detected longitudinal acceleration from the acceleration sensor, and a longitudinal acceleration selection portion configured to select an acceleration having a larger absolute value as a selected longitudinal acceleration from the estimated longitudinal acceleration and the detected longitudinal acceleration. The regenerative braking force calculation portion calculates the front wheel load and the rear wheel load based on the selected lateral acceleration and the selected longitudinal acceleration.

According to further another preferable configuration, in any of the above-described configurations, the regenerative braking force calculation portion outputs zero as the estimated lateral acceleration when a sign is different between the estimated lateral acceleration and the detected lateral acceleration.

Further, from another aspect, according to one configuration, a control apparatus for an electric vehicle is provided. The electric vehicle includes a front motor configured to output a torque to a front wheel of the electric vehicle by supply and reception of power to and from a power source, a rear motor configured to output a torque to a rear wheel of the electric vehicle by supply and reception of power to and from the power source, and a brake apparatus capable of providing a braking force to each of the front wheel and the rear wheel. The control apparatus causes a frictional braking force to be generated by the brake apparatus with a regenerative braking force generated by each of the front motor and the rear motor and a power limit imposed on the power source.

According to a further preferable configuration, in the above-described configuration, the control apparatus sets a regenerative braking force reduction ratio, which is a ratio of a regenerative braking force reduction amount of the rear motor to the regenerative braking force reduction amount of the front motor, according to the frictional braking force to be generated on the wheel of the electric vehicle by the brake apparatus. The regenerative braking force reduction amount is a difference between a first regenerative braking force and a second regenerative braking force when the regenerative braking force to be generated by each of the front motor and the rear motor is reduced from the first regenerative braking force according to a request braking force requested to the electric vehicle to the second regenerative braking force subjected to a power limit on the power source.

According to another preferable configuration, in any of the above-described configurations, the frictional braking force is based on a difference between the request braking force requested to the electric vehicle and the regenerative braking force subjected to the power limit on the power source.

According to further another preferable configuration, in any of the above-described configurations, the control apparatus reduces the regenerative braking force to be generated by each of the front motor and the rear motor from the first regenerative braking force to the second regenerative braking force in such a manner that a regenerative braking force reduction ratio matches or exceeds a frictional braking force front-rear ratio, which is a ratio of the frictional braking force to be generated on the rear wheel to the frictional braking force to be generate on the front wheel.

According to further another preferable configuration, in any of the above-described configurations, the control apparatus reduces the regenerative braking force to be generated by each of the front motor and the rear motor from the first regenerative braking force to the second regenerative braking force in such a manner that the regenerative braking force reduction ratio matches or exceeds the frictional braking force front-rear ratio and falls below a braking force request ratio, which is a ratio of the first regenerative braking force of the rear motor to the first regenerative braking force of the front motor.

According to further another preferable configuration, in any of the above-described configurations, the control apparatus reduces the regenerative braking force to be generated by each of the front motor and the rear motor from the first regenerative braking force to the second regenerative braking force in such a manner that the regenerative braking force reduction ratio matches the frictional braking force front-rear ratio.

Further, from another aspect, according to one configuration, a control system for an electric vehicle is provided. This control system includes a power source, a front motor configured to output a torque to a front wheel of the electric vehicle by supply and reception of power to and from a power source, a rear motor configured to output a torque to a rear wheel of the electric vehicle by supply and reception of power to and from the power source, a brake apparatus capable of providing a braking force to each of the front wheel and the rear wheel, and a control unit configured to control the front motor, the rear motor, and the brake apparatus. The control unit is configured to output an instruction for generating a frictional braking force to the brake apparatus, with an instruction for generating a regenerative braking force output to the front motor and the rear motor and a power limit imposed on the power source.

According to a further preferable configuration, in the above-described configuration, the control unit outputs an instruction for generating the frictional braking force based on a difference between the request braking force requested to the vehicle and the regenerative braking force subjected to the power limit on the power source to the brake apparatus.

According to another preferable configuration, in any of the above-described configuration, the control unit reduces the regenerative braking force to be generated by each of the front motor and the rear motor from the request braking force to the regenerative braking force subjected to the power limit in such a manner that a regenerative braking force reduction ratio matches a frictional braking force front-rear ratio, which is a ratio of the frictional braking force to be generated on the front wheel to the frictional braking force to be generated on the rear wheel. The regenerative braking force reduction ratio is a ratio between a front reduction amount of a reduction from the regenerative braking force according to the request braking force to the regenerative braking force subjected to the power limit on the front motor, and a rear reduction amount of a reduction from the regenerative braking force according to the request braking force to the regenerative braking force subjected to the power limit on the rear motor.

Further, from another aspect, according to one configuration, a control method for an electric vehicle is provided. This control method includes acquiring a request regenerative braking force to be generated on each of a front motor and a rear motor based on a request braking force requested to the electric vehicle. The front motor is configured to output a torque to a front wheel of the electric vehicle by supply and reception of power to and from a power source. The rear motor is configured to output a torque to a rear wheel of the electric vehicle by supply and reception of power to and from the power source. The control method further includes reducing the acquired request regenerative braking force based on a power limit on the power source, and outputting an instruction for providing a frictional braking force corresponding to a reduction amount of the request regenerative braking force to each of the front wheel and the rear wheel to a brake apparatus.

According to a further preferable configuration, in the above-described configuration, the reducing of the acquired request regenerative braking force includes setting a regenerative braking force reduction ratio, which is a ratio of a reduction amount of a reduction on the rear motor to a reduction amount of a reduction on the front motor, to a ratio equal to or higher than a frictional braking force front-rear ratio, which is a ratio of the front wheel frictional braking force and the rear wheel frictional braking force output in the outputting of the instruction.

According to another preferable configuration, in any of the above-described configurations, the reducing of the acquired request regenerative braking force includes setting the regenerative braking force reduction ratio to a ratio equal to or higher than the frictional braking force front-rear ratio and lower than a request regenerative braking force ratio, which is a ratio of the request regenerative braking force of the rear motor to the request regenerative braking force of the front motor.

According to further another preferable configuration, in any of the above-described configurations, the reducing of the acquired request regenerative braking force includes causing the regenerative braking force reduction ratio to match the frictional braking force front-rear ratio.

Having described several embodiments of the present invention, the above-described embodiments of the present invention are intended to only facilitate the understanding of the present invention, and are not intended to limit the present invention thereto. The present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

The present application claims priority under the Paris Convention to Japanese Patent Application No. 2017-109897 filed on Jun. 2, 2017. The entire disclosure of Japanese Patent Application No. 2017-109897 filed on Jun. 2, 2017 including the specification, the claims, the drawings, and the abstract is incorporated herein by reference in its entirety.

REFERENCE SIGN LIST

FL, FR front wheel
RL, RR rear wheel
1f front motor
1r rear motor
2f, 2r speed reduction mechanism
3f, 3r differential gear
4f, 4r drive shaft
5f, 5r inverter
6 stroke sensor
7 accelerator position sensor
8f, 8r resolver
9 brake controller
10 wheel speed sensor
11 CAN communication line (communication apparatus)
12 acceleration sensor
90 brake hydraulic unit
CU vehicle control unit
BCU battery control unit
MCUf, MCUr motor control unit

The invention claimed is:
1. A braking system, comprising:
an electric vehicle including
a front motor configured to output a torque to a front wheel of the electric vehicle by supply and reception of power to and from a power source, and a rear motor configured to output a torque to a rear wheel of the electric vehicle by supply and reception of power to and from the power source, a brake apparatus capable of providing a frictional braking force to each of the front wheel and the rear wheel, the braking system being configured to:

calculate a regenerative braking force to be generated on the front motor and the rear motor based on a request braking force requested to the electric vehicle;

reduce the regenerative braking force based on a power limit on the power source; and output an instruction for generating the frictional braking force according to a regenerative braking force reduction amount, which is an amount of a reduction in the regenerative braking force, to the brake apparatus, and a control apparatus, which is configured to reduce the regenerative braking force in the electric vehicle in such a manner that a regenerative braking force reduction ratio, which is a ratio of the regenerative braking force reduction amount of the rear motor to the regenerative braking force reduction amount of the front motor, matches a frictional braking force front-rear ratio, which is a ratio of the frictional braking force of the rear wheel to the frictional braking force of the front wheel;

calculate the regenerative braking force to be generated on each of the front motor and the rear motor based on the request braking force and a front wheel load and a rear wheel load of the electric vehicle;

calculate an estimated lateral acceleration to be generated on the electric vehicle based on a speed of the electric vehicle and a steering angle;

acquire a detected lateral acceleration from an acceleration sensor configured to detect an acceleration of the electric vehicle;

select an acceleration having a larger absolute value as a selected lateral acceleration from the estimated lateral acceleration and the detected lateral acceleration;

calculate an estimated longitudinal acceleration to be generated on the electric vehicle based on an instruction for a torque to be generated on an axle of the electric vehicle, acquire a detected longitudinal acceleration from the acceleration sensor;

select an acceleration having a larger absolute value as a selected longitudinal acceleration from the estimated longitudinal acceleration and the detected longitudinal acceleration; and calculate the front wheel load and the rear wheel load based on the selected lateral acceleration and the selected longitudinal acceleration.

2. The braking system according to claim 1, wherein the control apparatus is also configured to:

calculate an estimated lateral acceleration to be generated on the electric vehicle based on a speed of the electric vehicle and a steering angle; and calculate an estimated longitudinal acceleration to be generated on the electric vehicle based on an instruction for a torque to be generated on an axle of the electric vehicle, wherein the control apparatus is also configured to calculate the front wheel load and the rear wheel load based on the estimated lateral acceleration and the estimated longitudinal acceleration.

3. The braking system according to claim 1, wherein the control apparatus is also configured to output zero as the estimated lateral acceleration when a sign is different between the estimated lateral acceleration and the detected lateral acceleration.

4. A control method of an electric vehicle, comprising:

acquiring a request regenerative braking force of the electric vehicle to be generated on each of a front motor and a rear motor based on a request braking force requested to the electric vehicle;

outputting, with the front motor, a torque to a front wheel of the electric vehicle by supply and reception of power to and from a power source, outputting, with the rear motor, a torque to a rear wheel of the electric vehicle by supply and reception of power to and from the power source;

reducing the acquired request regenerative braking force based on a power limit on the power source;

outputting an instruction to a brake apparatus for providing a frictional braking force corresponding to a reduction amount of the request regenerative braking force to each of the front wheel and the rear wheel, wherein the request regenerative braking force of the electric vehicle is reduced in such a manner that a regenerative braking force reduction ratio, which is a ratio of the regenerative braking force reduction amount of the rear motor to the regenerative braking force reduction amount of the front motor, matches a frictional braking force front-rear ratio, which is a ratio of the frictional braking force of the rear wheel to the frictional braking force of the front wheel;

calculating the request regenerative braking force to be generated on each of the front motor and the rear motor based on the request braking force and a front wheel load and a rear wheel load of the electric vehicle;

calculating an estimated lateral acceleration to be generated on the electric vehicle based on a speed of the electric vehicle and a steering angle;

acquiring a detected lateral acceleration from an acceleration sensor configured to detect an acceleration of the electric vehicle;

selecting an acceleration having a larger absolute value as a selected lateral acceleration from the estimated lateral acceleration and the detected lateral acceleration;

calculating an estimated longitudinal acceleration to be generated on the electric vehicle based on an instruction for a torque to be generated on an axle of the electric vehicle;

acquiring a detected longitudinal acceleration from the acceleration sensor;

selecting an acceleration having a larger absolute value as a selected longitudinal acceleration from the estimated longitudinal acceleration and the detected longitudinal acceleration; and calculating the front wheel load and the rear wheel load based on the selected lateral acceleration and the selected longitudinal acceleration.

* * * * *